United States Patent
Valdemarsson et al.

(10) Patent No.: US 7,501,775 B2
(45) Date of Patent: Mar. 10, 2009

(54) SWITCHING DEVICE SYSTEM, COMPONENTS THEREFORE AND METHODS RELATING THERETO

(75) Inventors: Stefan Valdemarsson, Lidköping (SE); Per Larsson, Västerås (SE); Philip C. Kjaer, Västerås (SE); Per-Olof Thureson, Grängesberg (SE); Sjoerd G. Bosga, Västerås (SE)

(73) Assignee: ABB AB, Västerås (SE)

( * ) Notice: Subject to any disclaimer, the term of this patent is extended or adjusted under 35 U.S.C. 154(b) by 854 days.

(21) Appl. No.: 10/380,857

(22) PCT Filed: Sep. 18, 2001

(86) PCT No.: PCT/SE01/01991

§ 371 (c)(1),
(2), (4) Date: Jul. 2, 2003

(87) PCT Pub. No.: WO02/23572

PCT Pub. Date: Mar. 21, 2002

(65) Prior Publication Data

US 2004/0099639 A1 May 27, 2004

(30) Foreign Application Priority Data

Sep. 18, 2000 (SE) .............................................. 0003369

(51) Int. Cl.
*H01H 71/10* (2006.01)
*H02P 1/28* (2006.01)

(52) U.S. Cl. ........................ 318/16; 318/466; 318/560; 318/272; 318/455; 361/64; 361/115; 335/14

(58) Field of Classification Search ................... 318/16, 318/272, 455, 430, 264, 286, 560–570, 40–80; 307/139, 143; 361/64, 115, 97, 144; 335/14, 335/20, 68, 6; 705/8; 706/5, 15, 904, 905; 439/34, 489; 702/34, 115
See application file for complete search history.

(56) References Cited

U.S. PATENT DOCUMENTS

| | | | | |
|---|---|---|---|---|
| 3,688,262 A | * | 8/1972 | Liquori | 340/825.37 |
| 4,256,934 A | * | 3/1981 | Nogi et al. | 200/48 R |
| 4,264,960 A | * | 4/1981 | Gurr | 700/295 |
| 4,274,043 A | * | 6/1981 | Heitz | 320/117 |
| 4,281,304 A | * | 7/1981 | Koshman et al. | 335/72 |
| 4,307,302 A | * | 12/1981 | Russell | 307/40 |
| 4,368,394 A | * | 1/1983 | Naimer | 307/115 |
| 4,507,703 A | * | 3/1985 | Blau et al. | 361/193 |
| 4,654,492 A | * | 3/1987 | Koerner et al. | 200/564 |
| 4,689,493 A | * | 8/1987 | Nozick et al. | 307/147 |
| 4,701,630 A | * | 10/1987 | Annunziata et al. | 307/112 |

(Continued)

FOREIGN PATENT DOCUMENTS

| | | |
|---|---|---|
| WO | 99/52121 | 10/1999 |
| WO | 00/28565 | 5/2000 |
| WO | 00/36621 | 6/2000 |

*Primary Examiner*—Paul Ip
(74) *Attorney, Agent, or Firm*—Venable LLP; Eric J. Franklin

(57) ABSTRACT

The invention concerns a switching device system including at least one switching device, signal means and control means. Each switching device includes at least one mobile contact part, an electric motor and, coupling means. The coupling means is arranged to transfer motion from the electric motor to the mobile contact part. The control means is arranged to control the switching device. According to the invention the control means is at least partly remotely located from the switching device. The signal means transmit signals from the switching device to the remotely located control means and vice/versa. The signals represent real-time data and/or off-line data. The invention concerns also a switching device, control means and methods related to the invented system as well as computer program products for such system and electric power system being provided with such system.

31 Claims, 3 Drawing Sheets

U.S. PATENT DOCUMENTS

| | | | |
|---|---|---|---|
| 5,633,776 A * | 5/1997 | Juncu et al. | 361/115 |
| 5,861,683 A * | 1/1999 | Engel et al. | 307/38 |
| 5,990,638 A * | 11/1999 | Aoyama et al. | 318/85 |
| 5,995,910 A * | 11/1999 | Discenzo | 702/56 |
| 6,005,757 A * | 12/1999 | Shvach et al. | 361/64 |
| 6,055,144 A * | 4/2000 | Reid | 361/64 |
| 6,199,018 B1 * | 3/2001 | Quist et al. | 702/34 |
| 6,215,263 B1 * | 4/2001 | Berkowitz et al. | 318/272 |
| 6,252,365 B1 * | 6/2001 | Morris et al. | 318/455 |
| 6,262,550 B1 * | 7/2001 | Kliman et al. | 318/565 |
| 6,522,227 B1 * | 2/2003 | Mody et al. | 335/14 |
| 6,640,196 B1 * | 10/2003 | Unsworth et al. | 702/115 |
| 6,714,107 B2 * | 3/2004 | Mody et al. | 335/6 |
| 6,734,768 B2 * | 5/2004 | Kim | 335/6 |
| 6,746,250 B2 * | 6/2004 | Blutbacher | 439/34 |
| 6,750,567 B1 * | 6/2004 | Elli et al. | 307/143 |
| 6,757,665 B1 * | 6/2004 | Unsworth et al. | 706/15 |
| 6,787,937 B2 * | 9/2004 | Mody et al. | 307/115 |
| 2001/0020834 A1 * | 9/2001 | Berkowitz et al. | 318/272 |
| 2003/0046132 A1 * | 3/2003 | Keeley | 705/8 |
| 2003/0090349 A1 * | 5/2003 | Mody et al. | 335/68 |
| 2003/0123209 A1 * | 7/2003 | Kim | 361/144 |

* cited by examiner

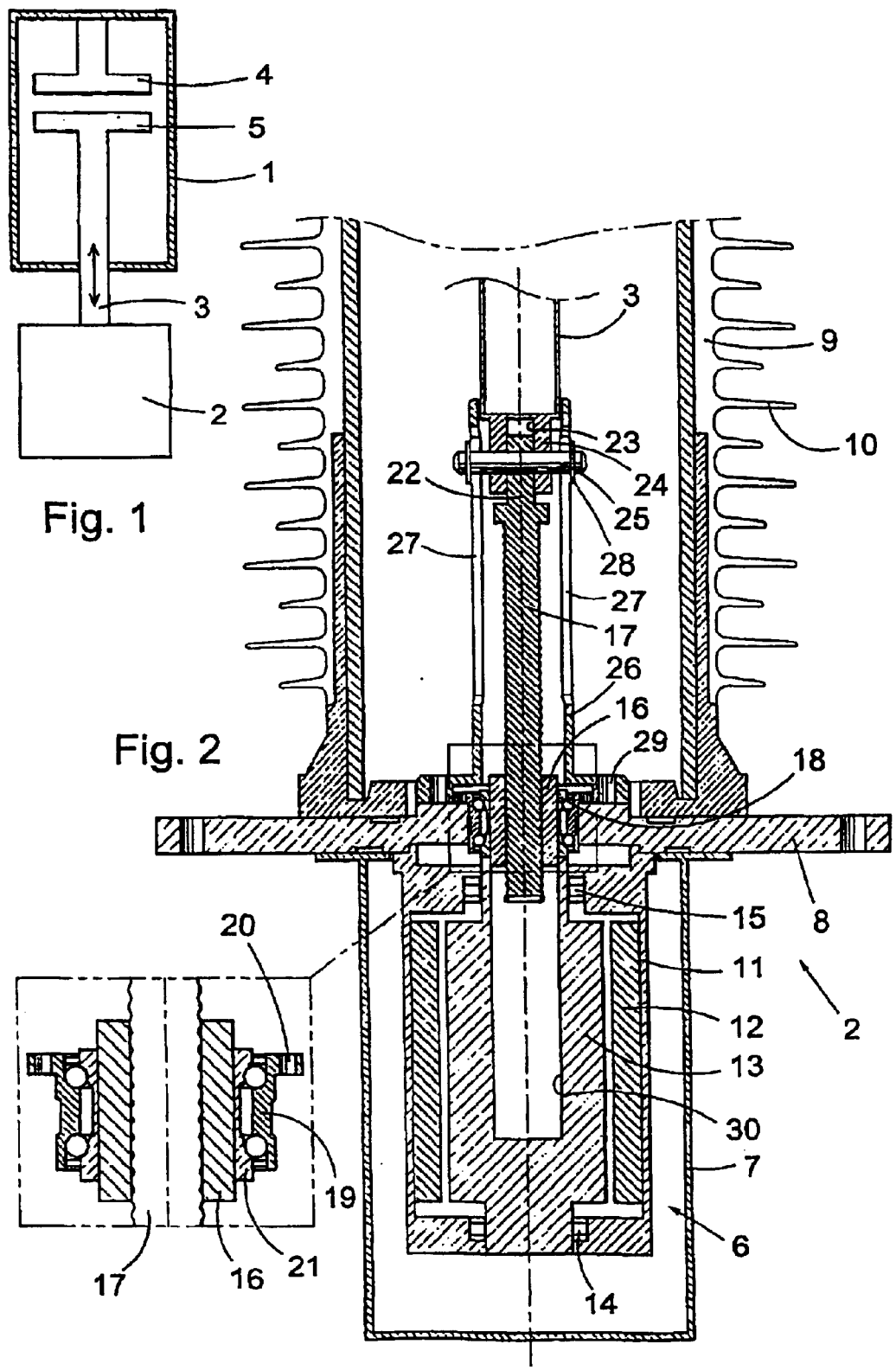

SWITCHING DEVICE SYSTEM, COMPONENTS THEREFORE AND METHODS RELATING THERETO

FIELD OF THE INVENTION

The present invention generally relates to a switching device system, components therefore and methods related thereto. More precisely the invention relates to the following aspects of such a system.

In a first aspect the invention relates to the system as such, namely to a switching device system of the kind including at least one electric switching device, signal means and control means the at least one switching device including at least one mobile contact part, an electric motor, coupling means, the coupling being arranged to transfer motion from the electric motor to the at least one mobile contact part, and the control means being arranged to control the switching device.

In a second aspect the invention relates to a switching device of the kind including at least one mobile contact part, an electric motor, coupling means, the coupling being arranged to transfer motion from the electric motor to the at least one mobile contact part.

In a third aspect the invention relates to a switching device control means.

In a fourth aspect the invention relates to a method for controlling at least one switching device, the at least one switching device including at least one mobile contact part, an electric motor and coupling means, the coupling means being arranged to transfer motion from the electric motor to the at least one mobile contact.

In a fifth aspect the invention relates to a method for providing a service to a user or proprietor of an electric power network including at least one switching device, which switching device includes at least one mobile contact part, an electric motor, coupling means, the coupling being arranged to transfer motion from the electric motor to the at least one mobile contact part and in which control means is arranged to control the switching device.

In further aspects the invention relates to computer program products and to computer readable media.

In still further aspects the invention relates to an electric power network.

BACKGROUND OF THE INVENTION

Traditionally, operating of switching devices is performed by use of spring mechanisms with enough energy to obtain opening and closing of switching device. In a classical spring operating mechanism OPEN and CLOSE signals are the only real-time signals present Spring mechanisms do not perform exactly the same from one opening/closing operation to another. Therefore, the time delay from order to completed operation is not constant. It is not possible to control and regulate the motion and position of the contact parts in an exact way. Communication in a system with a traditional spring switching device includes tripping coils.

In a switching device using a spring mechanism, the spring will apply the same force on the contact part at every operation, so it has to be designed to operate as if a worse case current were to be interrupted at every operation. In a spring mechanism, the time delay is not constant. In a spring mechanism system external measurement equipment must be connected to collect information regarding the operation of spring mechanism, and must remain connected during all switching device operation s from which one wants to obtain information. In practice this means that to test a switching device, it must be taken out of service, measuring equipment must be connected and some operations must be performed.

In order to overcome the drawbacks related to a spring operated switching device it has been suggested to use an electric motor for operating the mobile contact part. WO 00/136621 discloses an example of this type of switching device.

According to WO 00/136621 the movement of the mobile contact part is controlled. A control unit receives input information, which information includes information about the network condition, the movement of the mobile contact part, the movement of the rotor of the electric motor and/or instructions for an operator. Based on this information the control unit controls the motor movement by controlling the current supplied thereto. The movement follows a motion profile stored in the control unit and the movement is adapted to the feedback information from the input This known device represents an important improvement in relation to a spring operated switching device since it offers some degree of control of the motion. Furthermore operation and control of the switching device requires less local activity of service persons than traditionally operated switching devices.

Since this known device requires that the switching device has to be equipped with complicated software in order to control the motion of the mobile contact part to full extent, it follows that tests, adjustments and similar maintenance actions require local activity by service personal. Also supervising the switching device and adapting it to changing conditions has to be locally administered.

WO 00/28565 discloses a circuit breaker that in certain aspects can be remotely actuated. This known device has a receiver arranged to receive remotely transmitted control signals. These controls, however, mainly have the function of an on/off-control. The disclosure leaves unclear whether the control includes any possibility for more sophisticated control. Furthermore it is clear that there is no means allowing any feedback regarding the operation of the circuit breaker. This device therefore is not suitable for eliminating or reducing the need for local activities of the kind discussed above.

SUMMARY OF THE INVENTION

It is an object of the present invention to improve the control of a switching device of the kind disclosed in the above mentioned WO 00/36621 in a way that reduces the need for local sophisticated software and for local updating of the switching device.

This object has according to a first aspect of the invention been achieved in that a switching device system has the specific features that the control means at least partly is remotely located from the at least one switching device, the signal means being arranged to transmit signals from the at least one switching device to the remotely located control means and/or vice versa, said signals representing real-time data and/or off-line data.

In the context of the description of the present invention, "off-line data" means data that are transmitted other than in real-time.

The remotely located or distributed control means allows that obtaining data related to the op ration or other kind of performance of the switching device not necessary requires inspection on the spot. These data can by the signal means be transmitted to the remotely located control means and be stored and/or processed therein. The centralized collection of such data represent an important rationalisation in supervising the behaviour of the switching device. Instructions from the remotely located control means can also be used to update the software in the switching device without requiring local activity. Information about the behaviour of the switching device can be used as inputs for the instructions that are to be sent to the switching device from the remotely located control means. The information sent between the switching device and the remotely located control means can in both directions be real-time data in which case it is possible that the instructions for an operation are given direct dependency of feed-back information obtained during the operations and of information obtained in real-time from other devices. Also off-line information can be sent by the system. Data stored locally about the latest operation, accumulated information for a certain period etc. can be sent to the remotely located control means to be used for evaluating purposes. Based on such information the remotely located control means can send up-dating signals to the software in the switching device for adaption to correct improper performance or to changing operation conditions. Up-dating signals can also be send based on other information than such received from the switching device. As thus can be understood the system offers a rational and cost-effective way to attain a high degree of flexibility and a secure and accurate operation of the switching device.

According to a preferred embodiment of the invented system, the control means include motor control means and/or motion control means, the motor control means being arranged to obtain data relating to the operation of the electric motor and the motion control means being arranged to obtain data relating to the motion of the at least one mobile contact part and/or data relating to the status of an electric line to which the switching device is connected.

The information contained in these data are of particular importance since these on one hand informs about the condition and status of the switching device and on the other hand are useful as feed-back information for attaining an optimal operation pattern.

According to another preferred embodiment the signal means include electric wire, optical cable, transmitter/receiver for electromagnetic waves and/or internet connections. All these alternatives are possible and suitable for exchanging signals between the switching device and the remotely located control means. Which alternative or combination of alternatives that is optimal is depending on the specific application of the system. In particular the wire-less alternatives can be very advantageous and cost-effective when a large number of switching devices are included in the system.

According to yet another preferred embodiment of the system, the remotely located control means include primary control means and secondary control means, the secondary control means being located at a larger distance from the at least one switching device than the primary control means, preferably the distance is a plurality of powers of ten larger.

By dividing the remotely located control means into primary and secondary control means it is possible to attain an advantageous hierarchy in the controlling of a large number of switching devices. The primary control means can be arranged to be employed of the control of a certain group of switching devices in the system and contain logics adapted for that purpose whereas the secondary control means can have a supervising function for all switching devices and all primary control means in the system.

Thus, according to this embodiment it is preferred that the signal means include first signal means arranged to transmit signals between the primary control means and the at least one switching device, second signal means arranged to transmit signals between the secondary control means and the at least one switching device, third signal means being arranged to transmit signals between the primary control means and the secondary control means.

According to yet another embodiment of the invented system, the remotely located control means is connected by the signal means to a plurality of switching devices in an electric network, which can be a regional, national or international network.

Through this embodiment it is made use of the possibility that the switching devices can be controlled centrally for all or at least some of them. This allows simultaneous or Individual updating of the switching devices as well as a centralized control of the status of each switching device by performing diagnostic tests. Such tests can be done without making a complete breaking operation. The central control eliminates the need for local inspection and thereby offer cost savings.

According to a further preferred embodiment the remotely located control means include data storage means arranged to store data received by the signal means.

By including such storage means in the remotely located control means the advantages of the central supervision of the switching devices will be still more accentuated. The stored data provide information for attaining secure and accurate statuscheck, updating as well as the real-time control.

According to a further preferred embodiment the remotely located control means includes a central processor arranged to process received data and/or provide data for instruction signals.

By the central processor the information from each switching device as well as other inputinformation such as conditions in the network and external information can be used centrally and efficient for securing a reliable control of the switching devices.

According to a further preferred embodiment the control means include local control means at the switching device, which local control means is arranged to be affected by signals received from the remotely located control means.

By providing the system with such local control means it becomes possible to perform some aspects of the control locally. The system thereby can be laid out such that an optimized relation between which control functions that are performed locally and which that are performed centrally is achieved. This relation may be different for different systems and may also vary over time.

According to another preferred embodiment the local control means includes a local processor arranged to receive data, process data and/or provide instructions to the switching device, which received data include data received by signals from the remotely located control means.

Including this functionality in the local processor provides possibility to make use of specific advantages of the system such as the remote status check function and up-dating function.

According to another preferred embodiment the remotely located control means for one switching device includes other switching devices in the system, the switching devices being interconnected by signal means.

This embodiment allows information to be interchanged between switching devices in the system. One example of this can be that if one switching device fails to make a breaking operation it can signal information about that to another switching device so that the latter instead will perform the breaking.

The above described preferred embodiments of the invented system are described herein.

According to the second aspect the object of the invention has been achieved in that a switching device has the specific features that the switching device include signal receiving means and/or signal emitting means arranged to respectively receive and/or emit signals from/to remotely located control means.

This invented switching device thus will be adapted to be used in a system accordingly to the present invention. The switching device therefore offers advantages of similar kinds as those of the invented system and which has been described above.

Preferred embodiments of the invented switching device are described herein. These embodiments are adapted to various preferred embodiments of the invented system and offer advantages of corresponding kinds, as described above.

In the third aspect the object of the invention has been achieved in that a switching device control means includes the specific features that the control means is arranged to be remotely located from a switching device and being provided with signal receiving means and/or signal emitting means arranged to respectively receive and/or emit signals FROM/TO the switching device.

This invented switching device control means is specially adapted to be used in a system according to the present invention. The control means therefore offers advantages of the similar kinds as those of the invented system and which has been described above.

Preferred embodiments of the invented switching device control means are described herein. These embodiments are adapted to various preferred embodiments of the invented system and offer advantages of corresponding kinds as described above.

In the fourth aspect the object of the invention has been achieved in that a method includes the specific measures that signals are sent from and/or received to the switching device to/from a remotely located control means.

This invented method and the preferred embodiments thereof offer advantages of the same kinds as those for the invented switching device system and the preferred embodiments thereof. These advantages has been described above.

In a fifth aspect the object of the invention has been achieved in that a method includes the specific measures that the service includes controlling the switching device by receiving and/or sending signals to the switching device from a control means remotely located from the switching device.

This method is adapted to be used for a switching device system according to the invention and makes use of the possibility that control of the switching devices of a power network not necessarily has to completely be performed by the user/proprietor of the network. By providing certain functions of the control as an external service these functions can be performed from a body being specialized to provide such functions of the control. This external body might for example be the manufacturer of the switching devices.

According to a preferred embodiment of this method the service is conditionally provided to the user/proprietor. Data identifying a switching device and data informing whether the switching device meets predetermined condition is supplied to the remotely located control means. The remotely located control means controls the switching device in the response to these supplied data.

This allows that the service can be selectively performed.

According to another preferred embodiment the switching device is controlled on various service levels, the level depending on the supplied data.

This is one important aspect of how to selectively provide the service.

According to another preferred embodiment the various service levels include a full service level and a zero service level. By full service level is meant all control functions which the remotely located control means is arranged to be able to perform for the switching device. By zero service level is meant that the remotely located control means does not take part in the controlling at all. Intermediate levels might be tailored to e.g. perform breaking operation but not diagnostic tests and/or up-dating of the switching device.

According to another preferred embodiment, the data supplied to the remotely located control means include information about whether the user/proprietor has a service license or not. Said information is a useful criteria for if the remotely located control means will take part in the control of the switching device or not as well as determining on which level the control will be performed.

According to another preferred embodiment, service data related to the switching device are supplied to the remotely located control means, which service data include one of the following data or any combination thereof: duration and/or level of control from the remotely located control means, type and size of the switching device, amount of signals received and/or sent, amount of breaking operations.

By these data it can be easily determined to which extent the user/proprietor utilizes the control service.

According to another preferred embodiment these service data are stored in a storage means accessable by a processor in the remotely located controlled means and processed by the processor to provide information to be used for invoicing the user/proprietor.

Including this function in the remotely located control means offers a convenient and reliable possibility to determine the extent the service has been used and consequently how much the user/proprietor should be invoiced for that.

The above described preferred embodiments of the invented method for providing this service are described herein.

The object of the present invention are also achieved by providing computer program products and computer readable media adapted for use in the invented systems and methods. These will thus offer corresponding advantages.

Finally the object of the present invention is achieved in that an electric power network includes the invented switching device system or the invented switching device. Such network will have corresponding advantages as these related to the invented switching device system.

The invention will be further explained by the following detailed description of an advantageous exemplifying embodiment thereof and with reference to the accompanying drawings.

BRIEF DESCRIPTION OF DRAWINGS

FIG. 1 shows the principle of an electric switching device.

FIG. 2 shows a first embodiment of the actuating means of a switching device of a kind similar to that described in connection with FIG. 1.

DETAILED DESCRIPTION OF PREFERRED EMBODIMENTS

Figure 3:
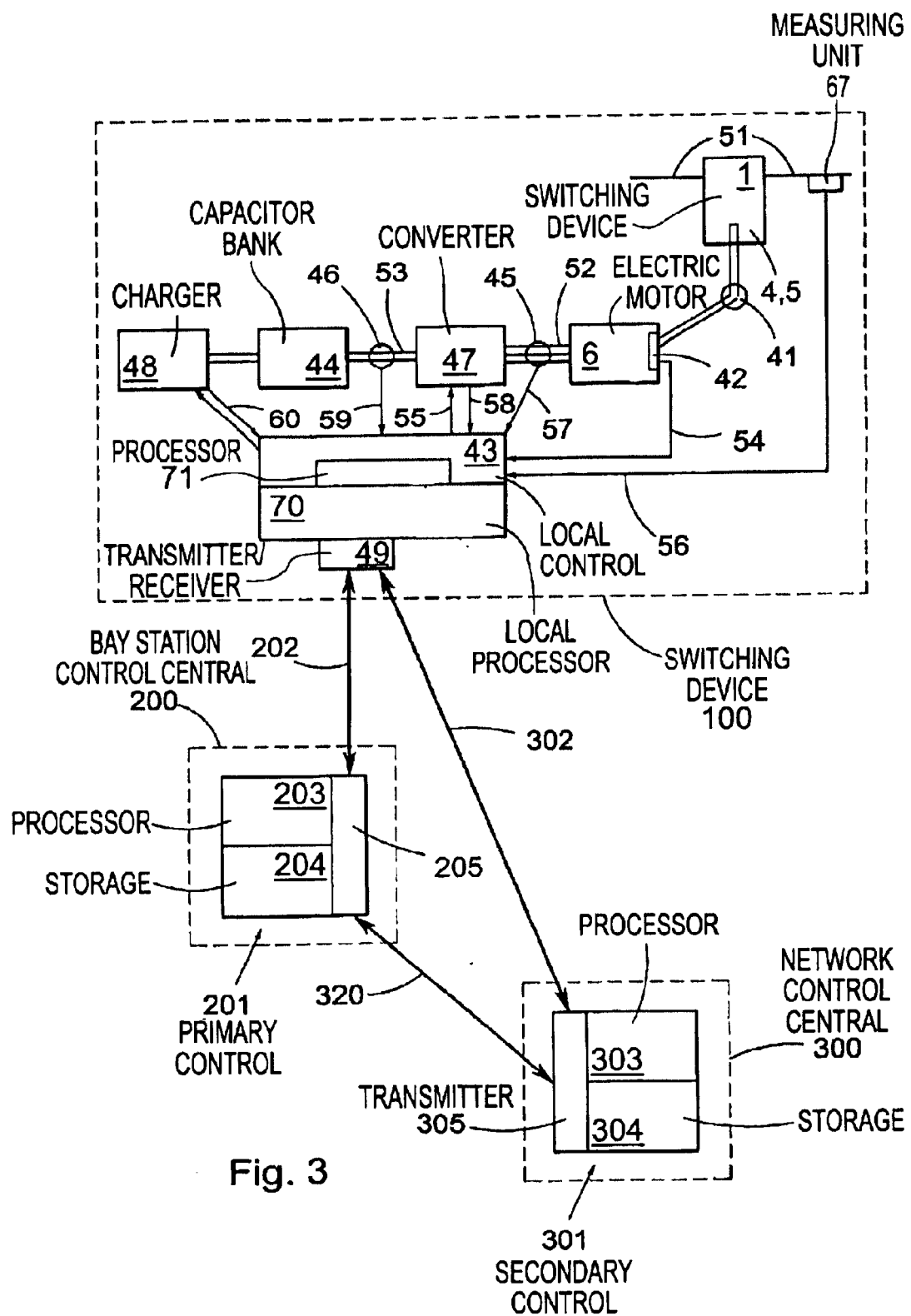
FIG. 3 shows a block diagram of a switching device system according to the present invention.

FIG. 1 schematically illustrates the principle of an electric switching device. It consists of a breaking chamber 1, actuating means 2 and an actuating rod 3. In the breaking chamber there is provided a stationary contact part 4 and a mobile contact part 5. Each contact part is connected to a conduct respectively. Under normal conditions the two contact parts 4, 5 are in contact with each other and current flows from the one contact part to the other through the switching device. When the current for some reason is to be interrupted, e.g. due to fault short circuit currents, the mobile contact part 5 moves away from the stationary contact part at high speed. Thereby initially an electric arc develops between the contact parts, which arc is extinguished shortly after contact part separation by means of an insulation gas. When the current thereafter is to be closed the mobile contact part 5 is displaced towards contact with the stationary contact part again. Initiating of the movement is performed manually or automatically. Breaking and closing of the switching device is attained through the actuating rod 3 connected to the mobile contact part and to drive means in the actuating unit. This general construction of a switching device is common to different types thereof and it is realised in many different ways. In the figure a lot of details normally present in a switching device are left out. This for the sake of clarifying the working principle as such. The following description relates primarily to detail 2 of the figure, i.e. the actuating means. In the figure the actuating means have been illustrated as a unit separated from the breaking chamber although in practice they are arranged as a common unit.

FIG. 2 illustrates a first embodiment of the actuating means 2 of a switching device of a kind similar to that described in connection with FIG. 1. The actuating means includes an electric motor 6 comprising a stator 12 and a rotor 13 enclosed by a hood 7. One end of the hood 7 is attached to a mounting plate 8, which is carried by a support, e.g. by means of bolts through borings 9 in the plate 8. From the side of the plate facing away from the motor a post 9 of insulating material e.g. porcelain extends upwards in the figure. The insulation post 9 is provided with flanges 10 on its exterior to attain an increased creep distance. Inside the insulation post the actuating rod is arranged. In the upper end, not shown, of the insulation post the breaking chamber is housed and its mobile contact part is rigidly connected to the actuating rod 3. The actuating rod 3, the insulation rod and the motor 6 are all coaxial.

A motion transforming mechanism is provided for transforming the rotary motion of motor rotor 13 to translatory motions of the actuating the rod 3 in order to open or close the switching device in accordance with what has been described in connection to FIG. 1. The motion transforming mechanism will be described more in detail in the following.

In the motor casing 1 the rotor 13 of the motor is journalled by a bearing 14, 15 at each end of the rotor. The stator 12 of the motor is attached to the motor casing 1 and the motor housing in attached to the mounting plate 8. The rotor 13 has a central axial boring 30 extending along the major part of the rotor length. The mounting plate 8 has an opening coaxial with the motor shaft in which opening a nut 16 is journalled for rotation in a double acting angular contact ball bearing 18. The outer ring 19 of the bearing 18 is attached to the mounting plate 8 by bolds, not shown, in borings 20 extending through a flange on the outer ring. An inner ring 21 of the bearing is rigidly connected to a nut 16. The inner ring 21 is also rigidly connected to the rotor 13.

A screw 17 extends through the nut, i.e. a rod having threads. The threads of the nut 16 and the screw 17 co-operate in engagement with each other. Relative rotation between them thus results in that the screw is axially displaced in relation to the nut. The end of the screw 17 that is remote from the motor, i.e. the upper end in the figure is connected to the actuating rod 3 of the switching device. This is accomplished in that the upper end of the screw extends into a boring 23 in the lower end 24 of the actuating rod. The connection is received by diametrically arranged pin 25 extending through the ends of the screw and the actuating rod.

From the mounting plate 8 a guiding sleeve 26 extends enclosing the screw 17. The guiding sleeve has diametrically located axially extending guide tracks 27. The pin 25 extends out through each guide track 27 and is provided with a locking washer 28 at each end. The guiding track 27 has a width corresponding to the diameter of the pin 25. Thereby the screw 17 is secured against rotation in relation to the guiding sleeve 26. The guiding sleeve 26 also is secured against rotation in that it is attached to the mounting plate 8 by means of not shown bolts through the borings 29. The guiding sleeve 26 has an inner diameter such that the actuating rod 3 with small clearance is inserted therein.

Thus, as the nut 16 by its journalling is axially fixed and the screw 17 by the arrangement described above is fixed against rotation it follows that rotational motion of the nut results in that the screw is forced to move axially.

FIG. 2 shows the switching device in its normal position when it is in closing position. When the switching device is to be activated to interrupt the current the motor is started so that its rotor 13 starts to rotate clockwise as seen from above in the figure. This forces the screw to move clockwise where through the mobile contact part 5 (see FIG. 1) is withdrawn from contact with the stationary contact part. The central boring 30 has a length giving space enough for the screw to be displaced a sufficient distance for completing breaking. During the breaking operation the lower part of the actuating rod will slide downwards in the guiding sleeve 26.

When breaking is completed the motor is stopped and now the lower end of the screw 17 is located dosed to the bottom of the boring 30. The pin 26 now is located at the lower end of the guiding track 27. When the switching device later is to be reset, the motor is started but with rotation in the opposite direction, so that the screw 17 and therewith the actuating rod moves upwards until the mobile contact part 5 again contacts the stationary contact part, and the components of the device will again have the position shown in FIG. 2.

The transformation of the rotary motion of the motor to translatory motion accomplished by actuating means of course can be arranged in many other ways than the one described in connection to FIG. 2 Furthermore it is not always necessary to transform the motion.

FIG. 3 is a block diagram showing an example of a switching device system according to the present invention.

The system mainly consists of the switching device 100 with its different components. The system further consists of a primary control means 201 located in a bay station control central 200 and of a secondary control means 301 in a network control central 300.

The bay station control central 200 is remotely located from the switching device 100 but normally within the same switchgear station or in the neighbourhood thereof. The distance between the bay station control central 200 and any of the switching devices 100 it controls is thus in the range of some meters up to some km.

The network control central 300 control is also remotely located from the switching device 100 and from the bay station control central 200. The network control central 300 controls switchgear stations and/or switching devices in a power network that can be regional, national or even international. It thus is normally located far more distant from the switching devices than the bay station control central 200. The distance to a switching device might be in the range of a few km to thousands of km.

The control of the operation of the switching device 100 is performed by local control means 43 at the switching device, the primary governing means 201 and the secondary governing means in cooperation with each other in various degrees. For that reason there is a signal line 202 connecting the primary control means 201 to the local control means 43, another signal line 302 connecting the secondary control means 301 to the local control means 43 and still another one 320 connecting the secondary control means 301 to the primary control means 201.

The signal lines 202, 302 and 320 bringing the remotely located means 201, 301 in contact with each other and with the switching device 100 can in principle be electric wires or optical cables. Alternatively the signal can be sent as electromagnetic waves, such as radio waves or through internet connection or any other means capable of transmitting signals over long distances. The form of the signals can be digital, analogue or in message form. In the following the description will refer to radio waves as signals.

The components of the switching device 100 is illustrated as a block diagram within the broken line 100. The switching device comprises a breaking chamber 1 with contact parts 4, 5. The switching device operates on a line 51 of an electric network, and each contact part 4, 5 is connected to a respective part of the line 51. One of the contact parts is mobile and is mechanically connected to an electric motor 6 through a mechanical coupling device 41 for transforming rotary motion of the electric motor to translatory motion of the mobile contact part 5. The arrangement of the breaking chamber, the mechanical coupling device and the electric motor can be as illustrated in FIGS. 1 and 2, but other arrangements can be used of course.

The electric motor 6 is connected by an electric coupling 52 to a converter 47. The converter 47 is connected by an electric coupling 53 to a capacitor bank 44. Electric energy for operating the switching device is supplied from the capacitor bank 44 to the converter 47. The converter converts the electricity and supplies it to the electric motor 6. The capacitor bank is charged by a charger 48 connected to a network supply or a battery supply.

The local control means 43 contributes to control the operation of the switching device. The control means 43 is arranged to obtain information related to the switching device and to provide control signals for its operation. A plurality of signal lines thus connects the control means 43 with other parts of the switching device. A first signal line connects the control unit with a position sensor 42 in the electric motor 6. The position sensor 42 is connected to the rotor of the electric motor to obtain data about its motion. These data can be position, speed or acceleration or a combination thereof. Since the movement of the rotor is transferred to the mobile contact part 5, the data of the rotor motion are indicative of the corresponding data of the mobile contact part 5.

Through a second signal line 55, the control unit 55 sends control signals to the converter 47, for controlling the operation of the electric motor 6. By the control signals, the converter 47 governs the motion of the electric rotor such as its position, speed and/or acceleration, and thereby the corresponding motion of the mobile contact part 5. The control signals are produced in response to the signals obtained from the position sensor 42 through the first signal line 54. By means of the control unit, the operation of the switching device thus is adaptively controlled in real-time.

A third signal line 56 connects the control means 43 with a measuring unit 67 In the line 51, on which the switching device operates. The measuring unit is arranged to measure the current in line 51 and the voltage across the switching device. Information on these measurements is sent to the control unit 43 through the signal line 56. This information also affects the control signals from the control means 43 to the converter 47 and therethrough the operation of the switching device. The information signals from the measuring unit 67 are also used to synchronise the operation of the switching device with the current and/or the voltage. At breaking operation, the switching device can be synchronised so that contact part separation occurs at zero crossing of the current or at a predetermined time relation to zero crossing. At closing, the switching device can be synchronised so that contact part meeting occurs at a predetermined moment in the voltage cycle.

Further inputs to the control unit are formed by fourth 57, fifth 58, sixth 59 and seventh 60 signal lines from various components of the switching device. Through the fourth signal line 57, signals are received from a current measuring unit 45 in the electric coupling 52 between the converter 47 and the electric motor. Through the fifth signal line 58, signals are received from the converter 47, which signals are representative of conditions in the converter, e.g. its temperature. Through the sixth signal line 59, signals are received from a voltage measuring unit 46 in the electric coupling 53 between the capacitor battery 44 and the converter 47. Through the seventh signal line 60, signals are received from the charger 48.

Information can be logged and stored in the storage means 70 associated with the control means 43. The storage means includes a plurality of logs, namely an operations log, an event/failure log, a last-operation log and a long-time log. The logs thus contain information on measurements, events and failures in the switching device and include operation parameters, such as contact parts position, speed and acceleration, rotor position, speed and acceleration, energy required for operation, temperature in the switching device during operation, voltage across and current through the switching device, data from the converter.

In the logs, information regarding self-diagnostic tests of the switching device can be stored as well.

The switching device is further provided with a processor 71, operating according to a computer program of a computer program product such as a computer readable medium. The computer program provides instructions to the processor 71 on how the information obtained from the different sources via the signal lines is to be processed in order to create control signals from the control means 43 for the operation of the switching device. The program also provides instructions on how the stored information affects the processing.

The switching device is further provided with a transmitter/receiver 49 for emitting and receiving radio wave signals from the primary and secondary means 201, 301.

The primary control means 201 is provided with a processor 203, data storage means 204 and a transmitter/receiver 205 for emitting and receiving radio wave signals to/from the switching device 100 and the secondary control means 301 is provided with a processor 303, data storage means 304 and a transmitter/receiver 305.

The local control means 43, the primary control means 201 and the secondary control means 301 cooperate on different levels in controlling the operation of the switching device.

For the control of the switching device, three different time scales can be distinguished. The first is real time communication having a time scale in the range of milliseconds. The second is diagnostic/statistic communication having a time scale in the range of seconds. And the third is set-up and maintenance communication for which a time scale is not relevant. The different control means 43, 201, 203 are active in various degree depending on to which of the time scales the control operation in question relates.

The communication in real time concerns mainly control of the opening/closing of the switching device. For that normally only the local control means 43 and the primary control means 201 are involved. Upon an opening command the control system obtains data related to the breaking operation. These data are related to the motion of the contact part, data related to the operation of the electric motor and data related to the condition in the line on which the switching device operates, as described above.

Data transmitted through the signal lines 54, 57 and 56 from the position sensor 42, the measuring unit 45 and the measuring unit 67 and received by the local control means are sent 202 by the transmitter/receiver 49 to the transmitter/receiver 205 of the primary control means 201.

The signals received by the transmitter/receiver 205 are processed in the processor 203 in the primary control means 201 in order to obtain signals for governing the operation of the switching device 100. These signals are sent 202 from the transmitter/receiver 205 in the primary control means 201 to the transmitter/receiver 49 in the local control means 43. These governing signals are processed in the processor 71 in the local control means 43 in order to provide a signal through signal line 55 to the converter 47 to govern the operation of the electric motor 6. Thereby a real time feed back is performed so that the operation of the switching device is adapted to the momentary conditions. This makes it possible to guarantee an exact, constant time delay between receiving the operation command and the contact separation/closing. This facilitates and improves the possibilities for synchronized breaking/closing.

The governing signals sent 202 from the primary control means 201 to the switching device 100 might also be based on further information and data than these received as feedback from the switching device 100. Thus information about which kind of current the switching device 100 is to interrupt, e.g. a short circuit current, capacitive, capacitive/inductive, normal load current can be an input for processing adequate governing signals to the switching device. 100.

A first kind of synchronizing the contact motion with the voltage across the switching device or the current therethrough has been mentioned above, namely a constant time delay between the moment an order is received and the contact is opened or closed respectively allows prediction equipment to send an order to the switching device in such a way that synchronisation is obtained. However the time between the order and the actual contact separation/closing is relatively large, typically around 20 ms on opening and 30 ms on closing. The fast bidirectional information between the record means 42 of the switching device and the primary control means 201 allows to:

continuously send signals about the exact desired opening/closing instant to the converter 47 for the motion control. The desired instant is thus updated even after the contact motion has started, allowing a very accurate prediction and thus improved synchronisation.

obtain feedback from the position sensor 42 regarding the realizable range of opening/closing instants. This range will become smaller as the opening/closing instant approaches.

The position sensor 42 constantly monitors the position and speed of the mobile contact part 5. Since this information is sent to the primary control means 201 this allows e.g. to detect whether or not the mobile contact part 5 has started its motion already after about 5 ms after reception of the order, much faster than today send an order to another switching device in case the first one is not reacting to an opening order.

The diagnostic/statistic communication will now be described.

To test the functionality of different components of the switching device such as the motor 6, the converter 47, the energy bank 44, the charger 48, the position sensor 42, the current sensors 45, the voltage sensor 46, the control electronics and software 43, the system will contain self-diagnostic functionality. Functionality of all or most of the components can be completely tested without the need to perform a breaker operation, without the need for human intervention, without being taken out of operation, and without the need for additional measurement equipment.

Self diagnostic tests can either be run periodically or on certain conditions, triggered by the switching device itself, or as a result of an external order. For example, the primary control means 201 in the bay station control central 200 can send signals through the signal line 202 to initiate diagnostic tests. Such tests can alternatively or supplementary be initiated by the secondary control means 301 in the network control central 300 through the signal line 302. These tests thus can be made in the latter alternative by the network administrator or even the manufacturer of the switching device.

Examples of self-diagnostic tests are:

micro motion: the motor 6 makes small movements without noticeably moving the breaker contact 5, due to the 180 degrees setup. This will test the functionality of local control means 43, converter 47, motor 6, current and position sensors 45, 42 capacitor test: slightly discharging the capacitors 44, using the motor 6 as a resistance will allow to estimate the capacitance, allowing detection of capacitor deterioration.

After a self-diagnostic test, either started after an external order or triggered by some internal condition, the switching device will inform about the result of this test. In case of a failure, or a component deterioration, either the manufacturer or a substation/network administrator can be notified by sending signals from the switching device 100 to the primary or the secondary control means 201, 301, respectively. This will allow to perform on-site maintenance strictly when required, as soon as required.

The system of the invention allows to set up collected datalogs

The system logs measurements and events into three different kinds of datalogs,

The following datalogs can be set up: event/failure log, operation log and last operation log.

Event/Failure Log

This log contains information regarding all events, including occurance of failures. It registers when a system restart occurs, which may be caused by disturbances i.e. EMC-problems. It registers when the dc voltage, the available energy is too low to operate the breaker. It registers all failures that cause the system to stop and wait for user intervention, such as failure of the position sensor 42, failure of current control 45 or converter 47, timing errors indicating a software problem, etc. Also whenever a motion order has been accepted it is logged.

Apart from the event itself, described by a short code, the log contains information regarding the time when the event occurred. The event/failure log is stored in non-volatile memory, e.g. the storage means 304 at the secondary control means 301 so that even a complete power outage will not erase the log.

On request, the contents of the log can be sent to an operator or computer e.g. sending the data contained in the log of the storage means 304 to the processor 203 in the primary control means 201 via the signal line 320 from the transmitter/receiver 305 at the secondary control means 301 to the transmitter/receiver 205 at the primary control means 201. The operator can also clear the log.

Collection of event/failure logs by at the second secondary control means 301 will allow to perform accurate reliability analysis of the system.

Operation Log

The operation log stores parameters describing each completed operation of the switching device. It contains a sequence number, allowing to see how many operations have been performed, the calculated contact separation/closing time, the contact speed, tha maximum motor current, the start and end voltage, a measurement of the energy used during the operation, the temperature in the system etc.

The operation log allows to perform statistical analysis on switching dvice operations without the need for external measurement equipment. For example, it can be checked whether the contact speed has been within specified limits during all operations, whether the speed or time is constant or slowly deteriorating indicating a need for maintenance, lower speed or higher time may indicate wear, a higher speed or lower time may indicate reduced gas pressure or replacement.

Comparison of actual log entries with factory log entries gives a direct indication on whether the breaker still performs as when it left the factory. Correlating the operation log and the event/failure log reveal the cause for breaker failures.

Last Operation Log

During each operation, motor currents, position, speed, torque, dc voltage, etc. are written to a log in (volatile) memory. This log can contain a large amount of data, and allows to observe in detail the behaviour of the control system. During development, this information is used to tune the parameters of the control, so that the desired contact motion is obtained. In case the breaker no longer performs according to specification, the information from this log contains useful information to determine the cause of the problem.

A copy of this log is written to non-volatile memory. This allows to investigate in detail the last operation of the breaker even in case of a power outage.

Status Information

At all times the system can provide status information to an operator or a computer. Examples of status information are:

the dc voltage by a measurement of available energy the rotor position from which the contact position can be calculated.

the software status such as what kind of order can be accepted, is the breaker operational or not the temperature in the cubicle event/failure messages the software version number the parameter setting version number The setup and maintenance communication will now be described.

Whenever software bugs are corrected or improvements have been implemented, the software of the processor 70 in the local control means 43 of the switching device 100 can be updated through a communication interface 302 between the secondary control means 301 and the local control means 43. During this updating, the breaker can not be operational. It is not needed to visit the breaker on site, and no special equipment is required. New functionality can be implemented in the switching device requiring hardware changes, and the manufacturer can enable or disable functions in agreement with the customer. An example of this could be to change the control during closing from normal, where the closing instant is not guaranteed to occur at a specific time instant, to synchronised, where the closing instant is at a specific time instant with respect to an external order.

Updated Parameters for Breaker Motion

If needed, the motion of the breaker contact can be adapted to meet special requirements from the customer by modifying the control parameters. These parameters are stored in non-volatile memory in the switching device. Fine tuning of the contact motion can be performed without being physically near the breaker. It should however be noted that due to the control system, containing feedback, tuning of the motion is normally done only once for all breakers of one model.

Updating parameters can also be useful when component of the switching device is replaced by a different one. For example, a faulty converter might be replaced by a newer model, or a control board with parameters for one breaker model may be put into a different breaker. The parameters can configurate the software in the control board to work with different motors, different converters, different breakers, etc.

Parameters can not only be downloaded to the switching device, they can also be retrieved. This allow to check the present settings of the switching device such as its actual parameters or actual software version. Also the version numbers of the software and the parameter setup can be retrieved.

The control of a switching device 100 in the system or at least aspects thereof can be provided as an external service to the entity which operates the network in which the switching device 100 is used. This service can be provided e.g. by the manufacturer of the switching device or any other external body. It is also possible that the external body providing the control service also is the proprietor of the switching device and provides the use of it on a licence basis or leasing it to the network operator.

In that case the secondary control means 301 is operated by the service provider. By communication between the secondary control means 301 and the local control means 43 through the signal line 302 the information necessary for recording data for evaluating the licence status and for calculating the fees for the services can be obtained. Alternatively this information can be obtained by communication between the second control means 301 and the primary control means 201.

The local processor 70 in the control means 43 of the switching device 100, any of the central processor 203, 303 in the primary control means 201 and the secondary control means 301, respectively each have relevant programs for executing the different control functions as described above.

Figure 4:
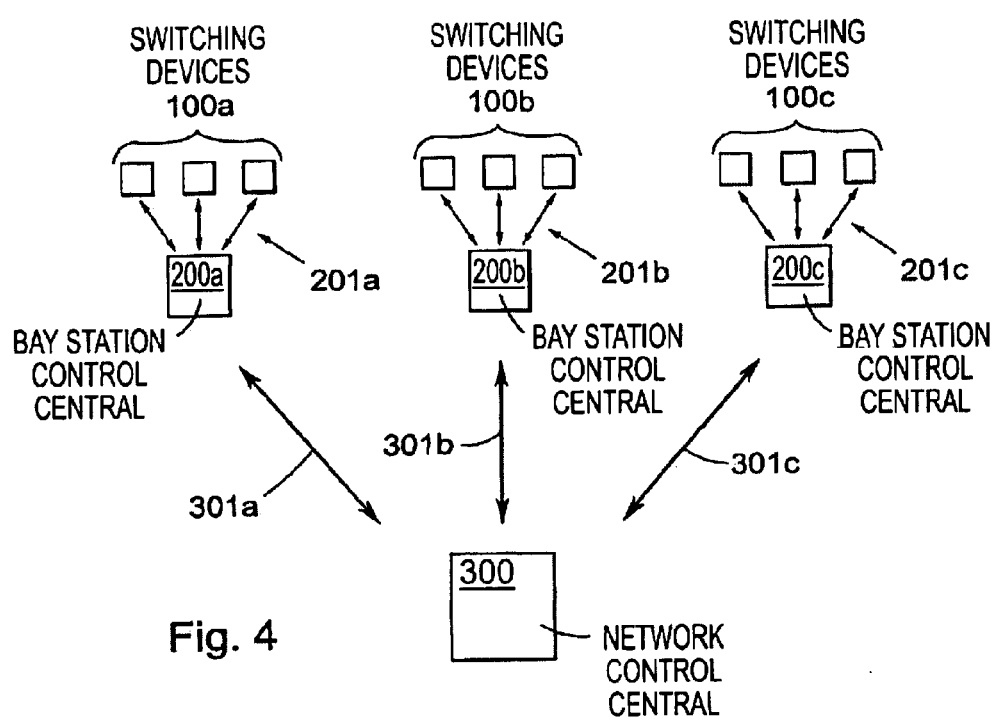
FIG. 4 shows a block diagram illustrating an electric power network according to the invention.

FIG. 4 shows a block diagram illustrating an electric power network provided with a switching control system according to the invention. A network control central 300 is in communication with a plurality of bay station control centrals 200a–c via signal line 301a–c. Each bay station is in communication with a plurality of switching devices 100a–c via signal lines 201a–c.

The network control central 300 is also in communication directly with the individual switching device 100a–c via signal lines.

The system might also include signal connection between the switching devices 100a within one bay station 200a and between switching devices 100a in one bay station 200a to switching devices 100b–c in another bay station 200b–c. Also the bay station control centrals 200a–c might be in communication with each other through signal lines.

The means for these communications are described more in detail above in the explanation of FIG. 3.

What is claimed is:

1. A switching device system, comprising:
at least one electric switching device, the at least one switching device comprising at least one mobile contact part, an electric motor, and a coupling, the coupling being arranged to transfer motion from the electric motor to the at least one mobile contact part;
a converter operatively connected to the electric motor to govern operation of the electric motor;
a position sensor operative to detect at one of a position, speed or acceleration of the at least one mobile contact part;
a measuring unit operative to measure at least one of a current through the at least one switching device or a voltage across the at least one switching device;
a control operative to receive signals from at least one of the position sensor and the measuring unit, and to control the switching device based upon the received signals, the control being at least partially remotely located from the at least one switching device; and
signal means operative to transmit signals between the at least one switching device and the control and/or vice versa, the signals comprising at least one of real-time data and off-line data.

2. The system according to claim 1, further comprising:
a voltage sensor operative to sense a voltage supplied to the converter; and
a current sensor operative to sense a current supplied to the electric motor;
wherein the control is operative to receive signals from at least one of the position sensor, the current sensor, the voltage sensor, and the measuring unit and to control the switching device based upon the received signals.

3. The system according to claim 1, wherein the control comprises at least one of a motor control and a motion control, the motor control being arranged to obtain data relating to the operation of the electric motor and the motion control means being arranged to obtain data relating to the motion of the at least one mobile contact part and/or data relating to the status of an electric line to which the switching device is connected.

4. The system according to claim 1, wherein the signal means comprises at least one of electric wire, optical cable, transmitter/receiver for electromagnetic waves or internet connection.

5. The system according to claim 1, wherein the remotely located control means comprises a primary control and a secondary control, the secondary control being located at a larger distance from the at least one switching device than the primary control.

6. The system according to claim 5, wherein the secondary control is located a distance that is orders of magnitude larger than the distance between the at least one switching device and the primary control.

7. The system according to claim 5, wherein the signal means comprises a first signal means arranged to transmit signals between the primary control means and the at least one switching device, second signal means arranged to transmit signals between the secondary control means and the at least one switching device, and third signal means arranged to transmit signals between the primary control means and the secondary control means.

8. The system according to claim 5, wherein the signal means comprises a first signal means arranged to transmit signals between the primary control means and the at least one switching device and second signal means arranged to transmit signals between the primary control means and the secondary control means.

9. The system according to claim 1, wherein at least a portion of the remotely located control means is connected by the signal means to a plurality of switching devices in an electric network, said network being a regional, national or international network.

10. The system according to claim 9, wherein the remotely located control means comprises primary control means and secondary control means, the primary control means being connected by signal means to a plurality of switching devices within an electric plant or a group of electric plants.

11. The system according to claim 1, wherein the remotely located control means includes data storage means arranged to store data received by the signal means.

12. The system according to claim 1, wherein the remotely located control means includes a central processor arranged to process received data and/or provide data for instruction signals.

13. The system according to claim 1, wherein the control means includes local control means at the switching device, which local control means is arranged to be affected by signals received from the remotely located control means.

14. The system according to claim 13, wherein the local control means includes a local processor arranged to receive data, process data and/or provide instructions to the switching device, the received data including data received by signals from the remotely located control means.

15. The system according to claim 13, wherein the local processor includes a computer program product which product is arranged to receive up-dating program-affecting signals from the remotely located control means.

16. The system according to claim 1, wherein the remotely located control means for one switching device controls other switching devices in the system, the switching devices being interconnected by signal means.

17. An electric power network, comprising:
a switching device system according to claim 1.

18. A switching device, comprising:
at least one mobile contact part;
an electric motor;
a converter operatively connected to the electric motor to govern operation of the electric motor;
a coupling arranged to transfer motion from the electric motor to the at least one mobile contact part;
a position sensor operative to detect at least one of a position, speed or acceleration of the at least one mobile contact part;
a measuring unit operative to measure at least one of a current through the at least one switching device or a voltage across the at least one switching device; and
at least one of signal receiving means or signal emitting means arranged to respectively receive and/or emit signals from/to remotely located control means.

19. The switching device according to claim 18, further comprising:
a voltage sensor operative to sense a voltage supplied to the converter; and
a current sensor operative to sense a current supplied to the electric motor.

20. The switching device according to claim 18, wherein the switching device further comprises a local control.

21. The switching device according to claim 20, wherein the local control comprises at least one of a motor control or a motion control, the motor control being arranged to obtain data relating to the operation of the electric motor and the motion control means being arranged to obtain data relating to the motion of the at least one mobile contact part and/or data relating to the status of an electric line, to which the switching device is connected.

22. The switching device according to claim 20, wherein the signal receiving means and the signal emitting means comprise at least one of electric wire connection, optic cable connection transmitter/receiver for electromagnetic waves or inter-net connection.

23. The switching device according to claim 20, wherein the local control means is arranged to be affected by signals received by the signal receiving means.

24. The switching device according to claim 23, wherein the local control means comprises a processor arranged to carry out at least one of receiving data, processing data or providing instructions to the switching device, the received data including data received by the signal receiving means.

25. The switching device according to claim 24, wherein the processor comprises a computer program product that is arranged to receive up-dating program-affecting signals received by the signal receiving means.

26. An electric power network, comprising:
at least one switching device according to claim 18.

27. A switching device control arranged to be remotely located from the switching device according to claim 18, the control comprising:
at least one of signal receiving means or signal emitting means arranged to respectively receive and/or emit signals from/to the switching device, the signals comprising data relating to the operation of the electric motor, data relating to the status of an electric line to which the switching device is connected and/or data relating to the motion of the at least one mobile contact part are obtained.

28. The control according to claim 27, wherein the signal receiving means and the signal emitting means comprises at least one of electric wire connection, optic cable connection, transmitter/receiver for electromagnetic waves or internet connection.

29. The control according to claim 27, wherein the control is arranged to control a plurality of switching devices within an electric plant, a group of electric plants, or a regional, national or international network.

30. The control according to claim 27, wherein the control comprises data storage means arranged to store data received by the signal receiving means.

31. The control according to claim 27, wherein the control comprises a processor arranged to process received data and/or provide data to the signal emitting means.

* * * * *